2,946,813
CONTINUOUS MANUFACTURE OF SOAP

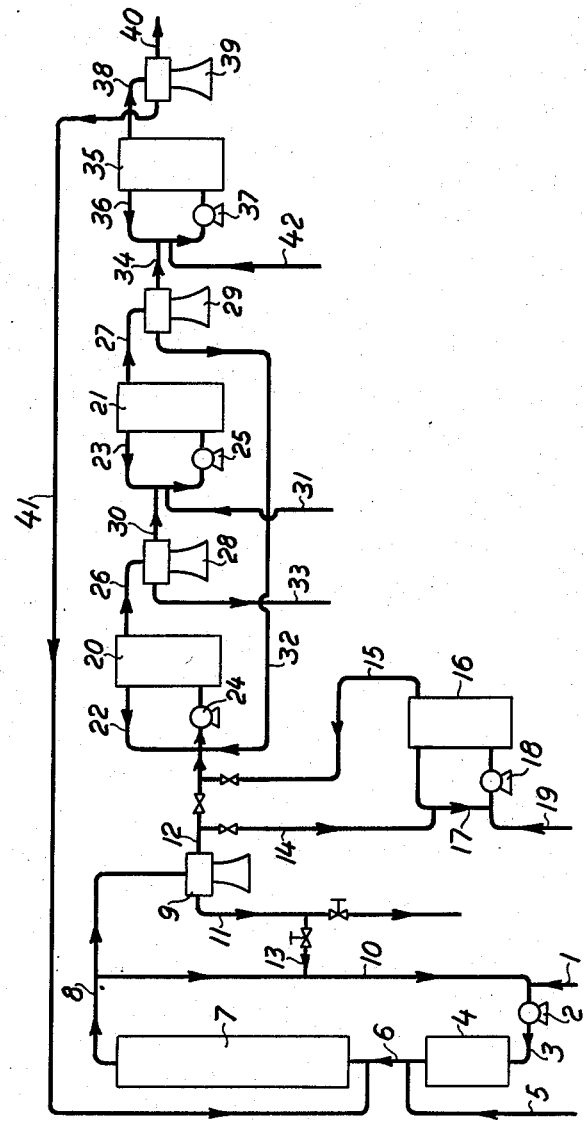

Fredrik Teodor Emanuel Palmqvist, Stockholm, Sweden, assignor to Aktiebolaget Separator, Stockholm, Sweden, a corporation of Sweden Filed Apr. 27, 1954, Ser. No. 425,880

10 Claims. (Cl. 260—417)

The present invention relates to a method for the continuous manufacture of high-grade soap.

The trend of recent developments in the art of soapmaking is toward lighter soaps, since light soap gives the impression of high quality and moreover is easier to color. To obtain light soap, however, fat of high quality is required, for instance, fat of the same quality as that used for the manufacture of edible fat, such as margarine. However, more and more low grade fats are being left for disposal by the soap industry, because the world demand for high-grade fats for the manufacture of edible fats is constantly rising.

If high-grade soap is to be made from low-grade fats according to the methods now commonly used, the fat must first be refined. The most common process for this purpose is to neutralize the free fatty acids of the fat with lye. As the content of free fatty acids in the low-grade fat usually is high, the refining losses in the form of soap produced during the neutralization will be great. The main part of the impurities of the fat accompany this soap, which is unsuitable for making high-grade toilet soap. Thus, it is possible in this way to recover first-rate fat from second-rate fat, but the yield often is low.

The present invention has for its object to solve the problem of making high-grade soap from low-grade fat or from soap stock, with a high yield. According to the invention, the low-grade fat is passed through a saponification stage, in which it is converted into a mixture of neat soap and nigre, and the discharge of this mixture from the saponification stage is followed by separation of the mixture into neat soap and nigre. In other words, the process is controlled in the saponification stage so that the soap mass therein is maintained in the fitting zone of a McBain diagram. This control is effected in a manner known in the art, that is, by supplying to the soap mass a regulated amount of an electrolyte solution, as disclosed in "Industrial Oil and Fat Products," by Bailey, New York, 1945, page 625. By proceeding as described above, the main part of the impurities contained in the fat is removed with the nigre, at the same time as the free fatty acids of the fat are utilized for the formation of soap. In this way, the neat soap is obtained relatively free from impurities. The neat soap separated out after the saponification stage may be used directly for certain purposes, without additional purification operations, such as for the manufacture of soap powder. If desired, it is also washed for this purpose one or more times with washing electrolyte, whereas the manufacture of toilet soap, for example, requires a more complicated process.

The soap mass coming directly from the saponification stage consists mainly of neat soap, nigre, glycerine and electrolyte. In this mass, the proportion of glycerine in the neat soap and the nigre is such that the major part of it is present in the nigre. As the glycerine further serves as an intermediary of solubility to the colored ingredients or impurities, these will be present mainly in the nigre and be entrained therewith during the separation. By wholly or partly carrying off the nigre from the process, the corresponding amount of impurities is also removed therefrom. Further, an efficient separation of the neat soap from the nigre and therefore from the impurities is facilitated by the fact that the glycerine, which has a relatively high specific gravity (1.26) is contained in the nigre in a relatively high concentration, since the saponification mass at this stage has not been diluted with graining-out or other electrolyte solution. The nigre is thereby given a high specific gravity and will be easy to separate from the neat soap.

In order better to utilize the ability of the nigre to extract impurities, it may be advantageous to send back to the saponifying stage a quantity of the nigre separated out and thus lead off only part of the nigre, for the same reason that reflux is used in distillation and extract is returned in selective extraction. The soap entering into the separation stage will thus be in phase equilibrium with a larger amount of nigre than that formed by the raw materials. This also has the advantage that more soap is recovered from the nigre. The degree to which nigre is returned is determined by the minimum requirements for the quality of the soap made. The nigre taken out from the process can be worked further, in the common manner, into soap of lower quality.

To improve the decoloring effect, bleaching agents (such as alkali hydrosulphite or alkali salts of peracids) can be supplied to the saponification stage, for instance, together with the lye. For the same purpose, bleaching of the neat soap separated out directly after the saponifying stage may be carried out in a separate stage. To make it possible to use this neat soap for the manufacture of a high grade toilet soap, for example, the neat soap from the saponifying or bleaching stage should be subjected to washing with an electrolyte solution in one or more stages, care being taken that the washing takes place during a certain graining out of the soap. To be made millable, the soap is then fitted.

After continuity in the operation has been obtained, the material may advantageously be kept in continuous circulation through a circuit in one or more (preferably all) of the saponifying, bleaching, washing and fitting stages. This gives among other advantages a good mixing effect in the various stages and, further, owing to the equalizing effect of the circuits, it may mean that dosing devices of simple construction will suffice.

The nigre which is separated out after the fitting stage can be returned altogether to the saponifying stage or to some of the washing stages, owing to its relatively high purity. Because the nigre separated off after the fitting can be returned altogether to a preceding stage, so that the soap content of the nigre is completely saved, it is possible by forming relatively large quantities of nigre to carry on the fitting far enough so that the soap product recovered from the process will be very high-class.

If the washing is carried out in several steps, it is preferable to supply fresh washing electrolyte to the last washing stage and to return washing electrolyte separated in one washing stage to a preceding washing stage, the washing electrolyte which is separated off in the first washing stage being withdrawn from the process. This results in a countercurrent washing, so that the neat soap is finally washed with fresh, pure electrolyte solution and the impurities are concentrated in the electrolyte solution withdrawn from the process.

Washing and fitting are carried out by means of electrolyte solutions commonly used for these purposes, usually a common salt solution or, possibly, caustic soda lye or a mixture thereof.

Regarding the soap yield obtained in the present process, it may be pointed out that the soap quantity lost with the strongly contaminated nigre leaving the process after the separation immediately following the saponifying stage is small in relation to the soap quantity which is lost when a low-grade fat is refined before it is used for the manufacture of soap.

The accompanying drawing illustrates diagrammatically and by way of example a plant for use in carrying out the present process. The raw materials are in the following assumed to be fat and lye, although any saponifiable material and saponification agent can, of course, be used.

In the drawing, which shows the various stages in the form of circuits, 1 designates a pipe through which lye is supplied to the saponifying stage, 2 a circulation pump and 3 a pipe leading therefrom to a reaction column 4 in which the soap mass formed is exposed to the action of a great excess of lye. Through a pipe 5, fat is introduced into the saponifying stage, more exactly in a pipe 6 connecting the column 4 with a further column 7 in which the freshly supplied fat may react with the lye. Ready saponified material is fed from the column 7 through a pipe 8 to a centrifuge 9. A portion of the last-mentioned material is, however, discharged through a pipe 10 which completes the circuit of the saponifying stage. In the centrifuge 9 the saponified material is separated into a nigre component discharged through a pipe 11, and a neat soap component discharged through a pipe 12. If considered desirable, a part of the separated nigre may be returned to the saponifying stage through a pipe 13.

To the pipe 12 a separate circuit may be connected in which the neat soap separated out is bleached before it is further treated. The neat soap is led to this bleaching circuit through a pipe 14 and is discharged therefrom through a pipe 15. The bleaching circuit proper comprises a reaction column 16 and a pipe 17 connecting its two ends, in which pipe a circulation pump 18 is inserted. Bleaching agent is supplied to the circuit through a pipe 19.

The bleached neat soap is fed from pipe 15 to two washing circuits formed, respectively, by columns 20 and 21, pipes 22 and 23 connecting the two ends of the respective columns, and circulation pumps 24 and 25 inserted in the respective pipes. Outlet pipes 26 and 27, respectively, convey the mixture of neat soap and washing liquid to centrifuges 28 and 29, respectively, in which neat soap and washing liquid are separated from each other. From the centrifuge 28, neat soap is fed through a pipe 30 into pipe 23 of the next washing stage, into which fresh washing electrolyte is also fed through a pipe 31. The washing electrolyte discharged from the centrifuge 29, having been used only for the final washing, may be used again for washing in the preceding stage, by leading it into the latter through a pipe 32. The washing electrolyte discharged from centrifuge 28, however, has been used twice, the second time for rough washing of the neat soap, and therefore contains large quantities of impurities. Owing to this fact, it is discharged from the process through a pipe 33. As the washing operations are carried out under conditions providing a certain salting-out effect, the washing electrolyte withdrawn from the process through pipe 33 contains insignificant quantities of soap.

The neat soap discharged from the centrifuge 29 is led through a pipe 34 to the fitting stage, which likewise is in the form of a circuit. This circuit is constituted by a column 35 and a pipe 36 connecting its two ends, in which pipe a circulation pump 37 is inserted. From the column 35, a mixture of fitted neat soap and nigre is led through a pipe 38 into a centrifuge 39, and from which neat soap separated out is withdrawn through a pipe 40 for further treatment, while the nigre separated out is returned to some of the washing stages or, as shown in the drawing, to the saponification stage through a pipe 41. Fitting electrolyte is fed to the fitting stage through a pipe 42.

Example 1

The example refers to the plant shown in the drawing. The temperatures have been kept at the following values: In the saponification stage, 105° C.; during the separation of the saponified mass in centrifuge 9, 100° C.; in the washing operations, 90° C.; and during the fitting, 90° C. The example further refers to the plant as operating in a state of continuous running. All parts are indicated in this as well as the following example as parts by weight per unit of time. Through the pipe 5, 100 parts of fat having the saponification number 210 are fed; and through pipe 1, 33.5 parts of 42.7% caustic soda lye are fed. The saponification stage is also supplied with 34.5 parts of nigre returned through the pipe 41, and 32.0 parts of nigre returned through the pipe 13. Thus, 200.0 parts of soap mass pass to the separator 9. In this separator, the soap mass is divided so that 36 parts of nigre are discharged through pipe 11 (of which, as mentioned above, 32.0 parts are returned to the process through the pipe 13) and 4.0 parts are discharged from the process. In these 4.0 parts of nigre, 1.5 parts are pure soap. Through the pipe 12, 164.0 parts of neat soap are discharged. In this case no bleaching is effected, for which reason the soap is fed directly into the pipe 22. In the system comprising the parts 20 to 34, washing is effected in two stages in countercurrent, 41.0 parts of 12.0% common salt solution being supplied through the pipe 31. Washing liquid containing glycerine and impurities is discharged through the pipe 33. Through pipe 34, 163.0 parts of neat soap are led into the pipe 36. The neat soap salted out is converted in the fitting stage 35—37 into nigre and fitted neat soap, by supplying 18.0 parts of 6.1% sodium hydroxide solution to this stage through the pipe 42. In the separator 39, neat soap is separated from nigre, the nigre (34.5 parts) being returned to the saponification stage through the pipe 41, and 147.0 parts of fitted neat soap of 70.0% soap content being discharged through the pipe 40. The color of this neat soap was determined in a Lovibond colorimeter with a 133 mm. cell. To enable measuring of the color the soap was diluted with 2% salt solution in a quantity such that the soap content in the solution was 17.0%. Further, the measuring was carried out at elevated temperature, since at room temperature a soap solution having this soap content is muddy. The following color was obtained: yellow 35.0; red 1.9; blue 0.1.

Example 2

For the sake of comparison, the following example applies to soap prepared without separation being made immediately after the saponification. The temperatures are the same as in Example 1 for corresponding stages. The same fat mixture is also used. 110.0 parts of fat mixture are saponified with 65.0 parts of 24.4% caustic soda lye. Since no nigre of low soap content is supplied to the saponifying stage, a lower concentration of the lye may be kept in this case. The soap mass from the saponifying stage is salted out with 33.0 parts of 16.1% sodium chloride solution in two stages in countercurrent, with separation between the stages. This gives 147.0 parts of salted-out neat soap, which is subjected to fitting treatment by being supplied with 9.5 parts of 6.9% sodium hydroxide solution. When separating the soap mass thus obtained, 15.5 parts of nigre of 32% soap content are obtained, which is drawn off. In this nigre there are thus 5.0 parts of pure soap. 141.0 parts of neat soap of 69.5% soap content are also drawn off. The color of the neat soap was determined in a Lovibond colorimeter in the same way as has been stated in Example 1. The following color was obtained: yellow 35.0; red 4.2; blue 0.5.

From these examples it appears that better color of the final product is obtained when operating according to the present invention, despite the fact that a smaller quantity of soap in the form of nigre is drawn off from the process.

Example 3

Also in this example the same plant as that shown on the drawing is employed. The temperatures have been the same as in Example 1. The example refers also to operation in a state of continuous running. As starting material a dark brown soapstock is used coming from refining of cotton oil. In order that the ready soap may be as hard as desired tallow also is added, besides the cotton soapstock. 100.0 parts of soapstock and 42.6 parts of tallow are supplied through the pipe-line 5. The soapstock contains 38.0 parts of fatty acids in the form of soap and 24.0 parts of free fat, emulsified in the soapstock. The neutralization number of fatty acids coming from splitting of fully saponified soapstock is 200 and the corresponding neutralization number of the fatty acids from tallow is 203. Through the pipe-line 1, 20.7 parts of 47.5% sodium hydroxide solution are supplied which is kept at +60° C. in order to prevent precipitation of sodium hydroxide. To this stage there are further supplied 20.9 parts of nigre through the pipe-line 41. Thus, 184.2 parts of soap mass pass into the separator 9. In this separator the mixture is separated in such a way that 20.0 parts of nigre are discharged from the process through the pipe-line 11. In the nigre discharged from the process are 6.0 parts of soap calculated to be 100%. This nigre is extremely contaminated. The color is black and the odor is extremely unpleasant. Large amounts of gossypol, proteins, calcium and magnesium salts, phosphatides and gums are present in the nigre. Owing to the good dispersing capacity of the nigre these substances are not precipitated, and therefore no depositing takes place in the separator bowl, either, but the process can proceed continuously without any inconvenient interruption for cleaning. The soap discharged through the pipe 12 is light in color and transparent and has a somewhat red tone. In this case the treatment stage in question has caused an extraordinarily strong refining of the inferior raw material which has been at disposal. Through the pipe-line 12, 164.2 parts of soap leave and are introduced into the pipe 22. Washing is carried out in two stages in counter-current in the devices 20—34, 45.3 parts of 7.5% salt solution being supplied through the pipe-line 31. Spent lye leaves through the pipe-line 33. 163.9 parts of neat soap are introduced through the pipe-line 34 into the pipe 36. In the devices 35—37 a fitting treatment is carried out so that the neat soap washed is transformed into a mixture of nigre and neat soap. During this treatment there are supplied, through pipe 42, 9.3 parts of 3.4% electrolyte solution, containing 0.8% sodium hydroxide and 2.6% sodium chloride, to this stage. In the separator 39 separation takes place, 20.9 parts of nigre being led back to the saponifying stage through the pipe 41 and 152.3 parts of fitted neat soap of 68% soap content being discharged through the pipe-line 40. The color of this soap has been determined in the manner defined in Example 1, the following values being obtained: yellow 70; red 16; blue 1.6.

Example 4

A comparative test analogous to Example 2 was carried out using the same raw material as that used in Example 3. As to the final product the following color values were obtained: yellow 70; red 60; blue 7.

As appears, a much darker final product than in Example 3 was obtained in this case. Moreover, the plant could be kept running only for a short time, because in the graining stage large amounts of precipitations were formed which deposited in the separator bowl and clogged this.

I claim:

1. In the continuous manufacture of soap from a saponifiable material, the improvement which comprises passing said material to a saponification stage and there saponifying said material while adjusting the electrolyte content of the saponification mass in relation to the soap concentration of the mass to maintain the mass within the fitting zone of a McBain diagram and thereby form a mixture of neat soap and nigre, discharging the mixture from said stage, and separating said mixture into neat soap and nigre.

2. The improvement according to claim 1, comprising also the step of returning at least a portion of the separated nigre to the saponification stage.

3. The improvement according to claim 1, comprising also the step of supplying a bleaching agent to the saponification stage.

4. The improvement according to claim 1, comprising also the step of bleaching the separated neat soap.

5. The improvement according to claim 1, comprising also the steps of washing the separated neat soap in at least one stage and fitting the washed soap.

6. The improvement according to claim 1, comprising also the steps of washing the separated neat soap in at least one stage, fitting the washed soap, separating nigre from the fitted soap, and returning at least a portion of said last nigre to one of said saponification and washing stages.

7. The improvement according to claim 1, comprising also the steps of washing the separated neat soap in a plurality of stages, by supplying fresh washing electrolyte to the last washing stage, feeding separated washing electrolyte from one washing stage to a preceding washing stage, and withdrawing from the process washing electrolyte separated in the first washing stage.

8. The improvement according to claim 1, in which the material undergoing said conversion is kept in constant flow through a circuit in the saponification stage, the neat soap and nigre mixture being discharged from said circuit to the separating operation.

9. The improvement according to claim 1, comprising also bleaching the separated neat soap in a further stage while keeping the soap in constant flow through a separate circuit in said further stage.

10. The improvement according to claim 1, comprising also the steps of washing and fitting the separated neat soap in further stages, while keeping the soap in constant flow through a separate circuit in at least one of said further stages.

References Cited in the file of this patent

UNITED STATES PATENTS

| 2,300,751 | Scott et al. | Nov. 3, 1942 |
| 2,336,893 | Scott | Dec. 14, 1943 |
| 2,653,958 | Lachampt | Sept. 29, 1953 |

FOREIGN PATENTS

| 520,285 | Great Britain | Apr. 19, 1940 |